(12) United States Patent
Asada et al.

(10) Patent No.: US 6,388,247 B2
(45) Date of Patent: May 14, 2002

(54) FINGERNAIL SENSORS FOR MEASURING FINGER FORCES AND FINGER POSTURE

(75) Inventors: Haruhiko H. Asada, Lincoln; Stephen Mascaro, Cambridge, both of MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/802,802

(22) Filed: Mar. 9, 2001

Related U.S. Application Data

(63) Continuation-in-part of application No. 09/253,437, filed on Feb. 19, 1999, now Pat. No. 6,236,037.
(60) Provisional application No. 60/079,866, filed on Mar. 30, 1998, and provisional application No. 60/075,279, filed on Feb. 20, 1998.

(51) Int. Cl.[7] .................................. G01L 5/22
(52) U.S. Cl. ....................... 250/221; 356/614
(58) Field of Search .................. 250/221, 231.19, 250/559.29; 356/614

(56) References Cited

U.S. PATENT DOCUMENTS

| | | | |
|---|---|---|---|
| 4,825,872 A | 5/1989 | Tan et al. | 128/633 |
| 4,830,014 A | 5/1989 | Goodman et al. | 128/665 |
| 5,088,817 A | * 2/1992 | Igaki et al. | 356/71 |
| 5,224,478 A | 7/1993 | Sakai et al. | 128/633 |
| 5,479,528 A | 12/1995 | Speeter | 382/115 |
| 5,581,484 A | 12/1996 | Prince | 364/559 |
| 5,612,689 A | 3/1997 | Lee, Jr. | 341/20 |
| 5,686,905 A | 11/1997 | Murata et al. | 340/825.79 |
| 5,703,623 A | 12/1997 | Hall et al. | 345/158 |
| 5,751,835 A | 5/1998 | Topping et al. | 382/115 |
| 5,776,059 A | 7/1998 | Kaestle et al. | 600/340 |
| 5,792,052 A | 8/1998 | Isaacson et al. | 600/323 |
| 6,236,037 B1 | * 5/2001 | Asada et al. | 250/221 |

FOREIGN PATENT DOCUMENTS

| | | |
|---|---|---|
| GB | 2 305 714 A | 4/1997 |
| WO | WO 93/15476 | 8/1993 |

* cited by examiner

*Primary Examiner*—F. L. Evans
(74) *Attorney, Agent, or Firm*—Bromberg & Sunstein LLP

(57) ABSTRACT

A device for detecting the posture a finger or forces applied to a finger, the finger having a fingernail illuminated by light, comprises at least one photodetector for measuring a change in light reflected by an area of the finger beneath the fingernail in response to the posture of the finger or forces applied to the finger. The photodetector provides a signal corresponding to the change in light reflected. The device also includes a processor for receiving the signal and determining whether the change corresponds to a specified condition. The photodetector may be enclosed in a housing and coupled to the fingernail.

24 Claims, 8 Drawing Sheets

US 6,388,247 B2

FINGERNAIL SENSORS FOR MEASURING FINGER FORCES AND FINGER POSTURE

The present application is a continuation-in-part of U.S. application Ser. No. 09/253,437, filed Feb. 19, 1999 now U.S. Pat. No. 6,236,037, and claims priority from U.S. provisional patent application Ser. No. 60/075,279, filed Feb. 20, 1998 and Ser. No. 60/079,866, filed Mar. 30, 1998, all of which applications are herein incorporated by reference.

This invention was made with government support under Grant Number DAMD17-98-2-8003 awarded by the U.S. Army. The government has certain rights in the invention.

TECHNICAL FIELD

The present invention relates generally to sensory feedback devices and, more particularly, the invention relates to sensors for detecting the posture of a human finger and external forces applied to a human finger.

BACKGROUND

Data gloves have been extensively studied in the past decade in the robotics and virtual reality communities and have been used for a variety of human-machine interactions. There are many ways of providing force feedback to a human from a virtual environment or from sensors on a robot, and many data gloves now make use of such force feedback. External finger forces are traditionally measured by placing sensing pads at the fingertips. However, few data gloves collect external-force data from the human fingers as the human interacts with the environment. To measure the forces acting at the fingers, for example, sensor pads comprising conductive rubber, capacitive sensors, and/or optical detectors can be placed between the fingers and the environment surface. These sensor pads, however, inevitably deteriorate the human haptic sense since the fingers cannot directly touch the environment surface. Moreover, sensor pads may deteriorate or wear out due to mechanical contacts.

Data gloves have also been used to measure the posture or position of human hands and fingers. Another problem presented by data gloves, however, in addition to blocking the natural human haptic sense, is that data gloves cover the fingers restricting the natural bending motion of the fingers.

SUMMARY

In accordance with one aspect of the invention, a device for detecting the posture of a finger, the finger having a fingernail illuminated by light, comprises at least one photodetector for measuring a change in light reflected by an area of the finger beneath the fingernail in response to the posture of the finger and providing a signal corresponding to the change in light reflected and a processor for receiving the signal and determining whether the change corresponds to a specified condition. The posture of the finger may be a bent position or an extended position. In a preferred embodiment, the photodetector is an array of photodetectors, the array of photodetectors having a spectral range. The spectral range may include visible and infrared wavelengths.

In another embodiment, the device further includes at least one light source, coupled to the photodetector, the light source for emitting light into the fingernail. In a preferred embodiment, the device further includes a set of light sources coupled to the photodetector, the set of light sources having varying wavelengths and for emitting light into the fingernail. In another further embodiment, the device further includes a housing that encloses the photodetector and a coupling element, connected to the housing, that couples the housing to the fingernail. In a preferred embodiment, the coupling element is a transparent adhesive material.

In accordance with another aspect of the invention, a method for detecting the posture of a finger, the finger having a fingernail illuminated by light, comprises providing at least one photodetector, measuring a change in light reflected by an area of the finger beneath the fingernail in response to the posture of the finger, providing a signal corresponding to the change in light reflected and comparing the change and a specified condition. the posture of the finger may be a bent position or an extended position. The photodetector may be an array of photodetectors having a spectral range. In a preferred embodiment, the method further includes illuminating the fingernail with light from a light source. In an alternative embodiment, the method further includes illuminating the fingernail with a set of light sources having varying wavelengths. The method may further include enclosing the photodetector and the light source in a housing and coupling the housing to the fingernail.

In accordance with another aspect of the invention, an apparatus for detecting a force applied to a finger, the finger having a fingernail illuminated by light includes at least one photodetector for measuring a change in light reflected by an area of the finger beneath the fingernail in response to the force applied to the finger and providing a signal corresponding to the change. The apparatus also includes a processor for receiving the signal and determining whether the change corresponds to a specified condition. In one embodiment, the force applied to the finger is a shear force. In an alternative embodiment, the force applied to the finger is a normal force.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF PREFERRED EMBODIMENTS

A new approach to the detection of finger forces and finger posture is presented that eliminates the impediment of the natural haptic sense and the restriction of the natural bending motion of the finger as caused by traditional electronic gloves. Specifically, finger forces and finger posture are detected by an optical sensor mounted on the fingernail. This allows a person wearing the sensor to touch the environment with bare fingers and perform fine, delicate tasks using the full range of haptic sense as well as the unrestricted motion of the finger. Furthermore, unlike known data gloves and finger touch-force sensors, preferred embodiments of the sensor may have a longer lifetime since such sensors do not contact the environment and have no mechanical parts to wear or become damaged due to mechanical contacts.

As a force is applied to a finger, for example, a normal force as the finger is pressed on a surface with increasing force, a sequence of color changes is observed through the fingernail. FIGS. 1a–1d schematically show a series of typical color changes observable through a fingernail in response to a normal force applied to a finger. As shown in FIGS. 1a–1d, an area of the finger beneath the fingernail changes color from pale red to a more intense red with increasing force applied to the finger. In fact, the color change visible through the fingernail is characteristically non-uniform across the nail, resulting in distinct patterns of color change. Although the color change may vary from person to person, the underlying physiological principle is universally applicable for a healthy finger and fingernail in an ordinary environment.

Figure 1A:
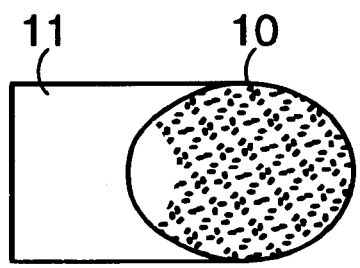
FIGS. 1a–1d schematically show a series of typical color changes visible through a fingernail in response to a normal force applied to a finger.
Figure 1B:
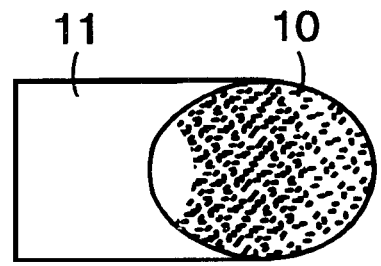

In FIG. 1a, when a force below a first threshold, for example 0.3 N, is applied to a finger the entire area beneath the fingernail 10 begins to redden in color. The dermis becomes richly vascularized with large arteriovenous shunts. As forces greater than the first threshold are applied to the finger, the venus return of blood in the fingertip is progressively constricted. This results in the pooling of arterial blood in the capillaries underneath the fingernail 10 and cause the area beneath the fingernail 10 to become darker red in color as shown in FIG. 1b. The arterial blood which pools underneath the fingernail 10 is rich in oxy-hemoglobin and therefore, bright red in color. When the force applied reaches a second threshold, for example 1N, the vein will be completely blocked and the color observable through the fingernail stops reddening with further increase in contact pressure.

Figure 1C:
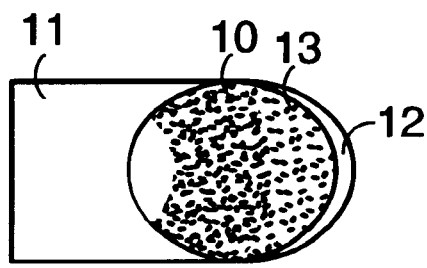

If, however, the force applied is further increased above the second threshold, as shown in FIG. 1c, the arterial supply at the tip of the finger will be constricted causing the blood to be pushed out of this region, resulting in a white band 12 at the tip of the finger. The rest of the color observable through the fingernail 13 remains deep red, as the capillaries are protected from the pressure of the touch force by the bone of the distal phalanx 11, which is connected to the fingernail via a strong matrix of collagen and elastic fibers. The condition, as shown in FIG. 1c, will occur as the force applied is between the second threshold and a third threshold, for example between 1N and 4N.

Figure 1D:
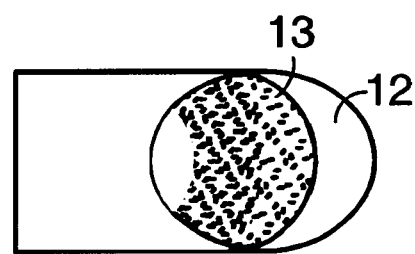

If the force applied to the finger is increased above the third threshold, for example 4N, the white band 12 widens until some limit is reached as shown in FIG. 1d. Further increases in contact pressure beyond this limit will have no further visible effect. However, forces applied longitudinally to the front of the fingertip and shear forces along the same direction are more effective at exerting stresses on the tissue above the bone and are therefore capable of increasing the white band 12 even further.

Figure 2A:
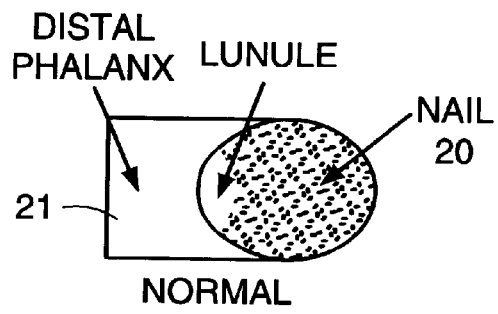
FIGS. 2a–2d schematically show a series of typical color changes visible through a fingernail in response to a shear force applied to a finger.
Figure 2B:
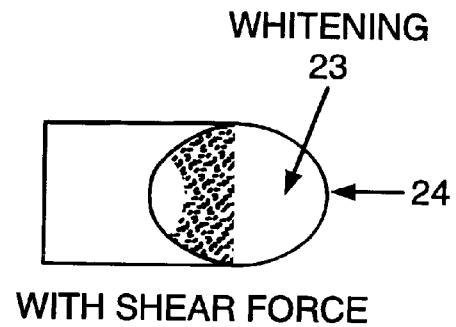
Figure 2C:
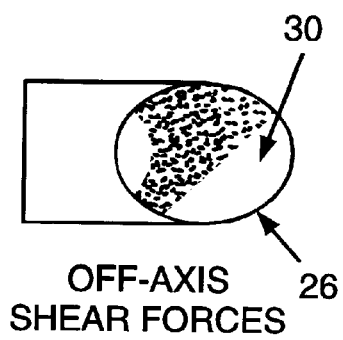
Figure 2D:
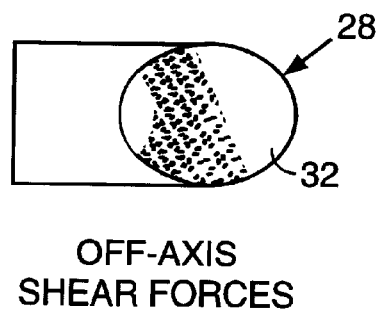

FIGS. 2a–2d schematically show typical color changes observable through a fingernail in response to shear forces applied to a finger. A shear force is a sliding force applied to a finger along the direction of the contacting surface. Shear forces may be applied along a lateral axis, a longitudinal axis or off-axis. FIG. 2a shows a finger 21 and fingernail 20 with no shear forces applied. When shear forces are applied to the palmar surface of the fingertip, a pattern of color change results in the area of the finger beneath the fingernail as shown in FIGS. 2b–2d. In FIG. 2b, a longitudinal shear force 24 is applied to the finger.

As the longitudinal shear force is applied, a tension in the tissues of the nail bed develops, resulting in a broad whitening effect 23 over the front of the nail. If the direction of the shear force deviates in either direction from the longitudinal axis, then the whitening zone shifts towards the right or left of the nail as shown in FIGS. 2c and 2d. In FIG. 2c, an off-axis shear force 26 to the right of the longitudinal axis produces a whitening zone to the right side of the fingernail. In FIG. 2d, an off-axis shear force 28 to the left of the longitudinal axis produces a whitening zone 32 to the left side of the fingernail. Unlike the color change due to normal forces, the whitening zone for a shear force is concentrated towards the front of the nail and extends farther back. Such factors may be used to distinguish between a normal force from a shear force.

Figure 3A:
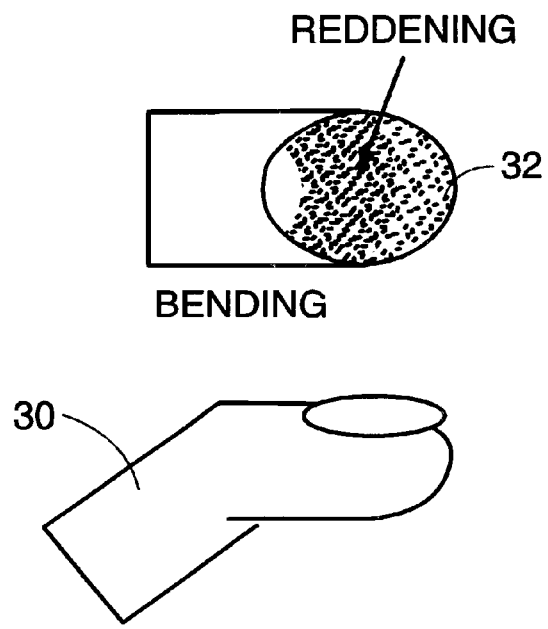
FIGS. 3a–3b schematically show typical color changes visible through a fingernail in response to a change in posture of a finger.
Figure 3B:
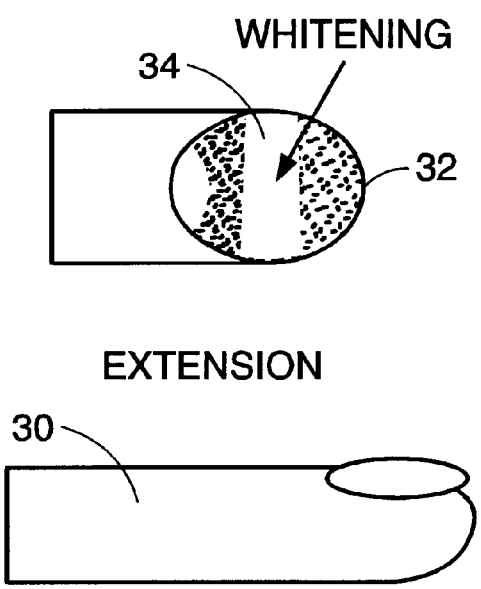

When the posture of a finger is altered, i.e., the joints of the finger are bent or extended, a sequence of color changes may be observed through the fingernail. FIGS. 3a and 3b show typical color changes visible through a fingernail in response to the bending and extension of a finger. In FIG. 3a, the bending of a finger 30 will cause an overall reddening effect ("reddening zone") that may be observed through a fingernail 32. As the finger 30 is bent, the veins that lie close to the palmar surface of the fingertip are creased, cutting off the flow of blood out of the fingertip. This causes blood to pool in the nail bed capillaries, contributing to the reddening effect visible through the fingernail 32.

In FIG. 3b, when the finger 30 is extended, a region of the finger beneath the fingernail 32 forms a white band 34 ("whitening zone"). As the finger 30 is extended, tension develops in the skin and outer layers of tissue of the finger 30. This tension creates a stress between the fingernail and the nail bed underneath. The stress collapses the capillaries and drives blood out of the nail bed, contributing to the whitening effect 34 visible through the fingernail. The color changes shown in FIG. 3b are concentrated near the center of the nail, whereas the color changes due to normal and shear forces occur toward the front of the nail. Such factors may be used to distinguish between a normal force or shear force and changes in finger posture.

The above described phenomena may be utilized to measure external forces applied to a finger as well as the posture of the finger, by monitoring changes in the color of the area of the finger beneath the fingernail. The change in color is directly related to the pooling of arterial blood (i.e., the change in blood volume) and its oxy-hemoglobin saturation (i.e., the relative concentrations of oxy- and reduced-hemoglobin). In accordance with preferred embodiments of the invention, the amount of blood under the fingernail bed can be monitored by shining light into the fingernail and measuring the reflectance using photodetectors. This technique is termed "photo-plethysmography." The output of the photodetectors is proportional to the intensity of reflected light, which depends on the volume of blood in the nail bed. By comparing and contrasting the color measurements from one or more photodetectors along the length of the fingernail, external forces and bending angle can both be estimated using the fingernail sensors.

Figure 4A:
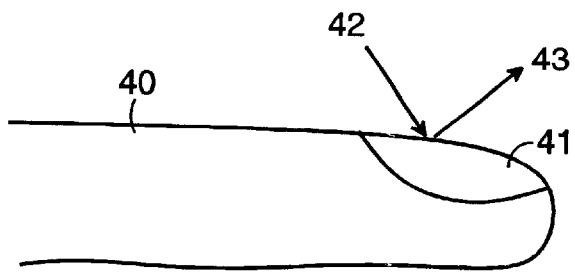
FIG. 4a schematically shows a fingernail sensor circuit that may be utilized in accordance with an embodiment of the invention.
Figure 4A:
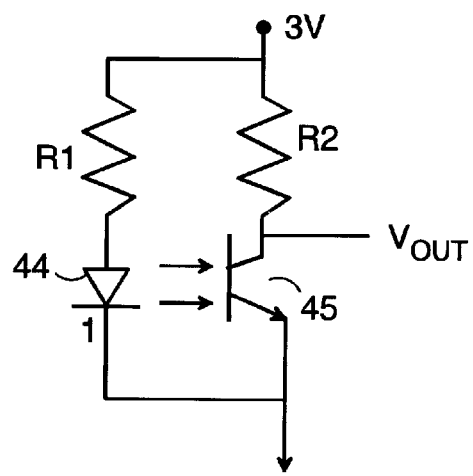

An embodiment of a fingernail sensor circuit is shown in FIG. 4a. Note that other electrical configurations of the sensor may be utilized to detect external forces or the finger posture in accord with preferred embodiments of the invention. Accordingly, the specified electrical circuits merely show preferred implementations of a fingernail sensor circuit. In FIG. 4a, a light source 44 transmits light 42 into a fingernail 41 of a finger 40. In the embodiment shown in FIG. 4a, the light source 44 is a red light emitting diode ("LED") at 660 n.m. which illuminates the fingernail 41 with a red light. A photo-detector 45 is mounted on one side of the light source 44 and catches the reflected light 43 from the area of the finger beneath the fingernail 341. In the embodiment of FIG. 4a, the photodetector 45 is a phototransistor.

As mentioned above, the behavior of the output voltage, Vout, of the photodetector 45 depends, in general, on the amount of light reflected from the area of the finger 40 beneath the fingernail 41. The amount of light reflected may be affected by a number of factors including the volume of blood underneath the fingernail and the amount of oxygen saturation of the blood underneath the fingernail. As discussed above, changes in the amount of blood underneath the fingernail 41 result in color changes observable through the fingernail (e.g., a "reddening zone" or a "whitening zone"). A "reddening zone" is a region of the finger beneath the fingernail that becomes darker red in color because the volume of blood underneath the fingernail is increasing. A "whitening zone" is a region of the finger beneath the fingernail that becomes more white in color because the volume of blood underneath the fingernail is decreasing.

In a reddening zone, the volume of blood increases under the fingernail resulting in two phenomena. First, the additional volume of blood under the fingernail 41 increases the effective path length over which the light is absorbed which tends to increase the absorption of light and, therefore, reduce the amount of light reflected by the area of the finger beneath the fingernail. Second, the increase in oxygen saturation of the blood underneath the fingernail decreases the absorption coefficient of the blood which tends to decrease the absorption of light and, therefore, increase the amount of light reflected by the area of the finger beneath the fingernail. In a preferred embodiment, the phenomena caused by the increase in blood volume underneath the fingernail 41 is measured.

In a whitening zone, the volume of blood under the fingernail decreases. The reduction of blood under neath the fingernail tends to decrease the absorption of light and, therefore, increase the amount of light reflected by the area of the finger beneath the fingernail. The following discussion of FIGS. 4a to 8 will refer to the behavior of the fingernail sensor in response to an increase or decrease in the volume of blood underneath the fingernail.

Returning to FIG. 4a, the behavior of the fingernail sensor circuit will first be described with respect to contact pressure (or normal force) applied to the finger. The output of the photodetector 45, Vout, is a positive value. As discussed above with respect to FIGS. 1a–1d, increasing contact pressure results in both a reddening zone, typically towards the rear of the nail and a whitening zone, typically towards the front of the nail. In the reddening zone, as the contact pressure on finger 40 increases, the volume of blood underneath the fingernail 41 also increases. As the volume of blood increases, more light is absorbed and less red light is reflected by the area of the finger beneath the fingernail. As a result, the impedance of the phototransistor 45 rises and the output of the photodetector, Vout, increases.

If, however, the photodetector 45 is measuring the color change in the "whitening" zone (See FIGS. 1c and 1d) of fingernail 41, Vout will decrease with increasing contact pressure. As described above with respect to FIG. 1c, as the force applied to the finger 40 is increased, the arterial blood supply at the tip of the finger will be constricted causing blood to be pushed out of the region, resulting in a decrease in the volume of blood underneath the fingernail 41. As the blood underneath the fingernail 41 in this region is decreased, the absorption of light is also decreased. As a result, Vout will decrease with increasing contact pressure in the "whitening" zone.

Figure 4B:
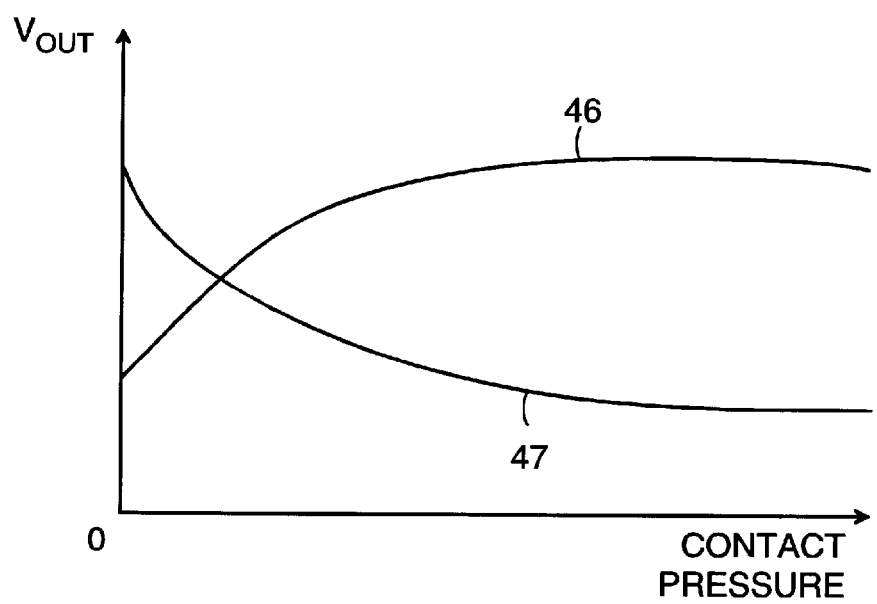
FIG. 4b schematically shows a graphical representation of the output voltage, Vout, of a photo-detector as a function of contact pressure when using either the circuit as shown in FIG. 4a or the circuit as shown in FIG. 6.

FIG. 4b is a graphical representation of the output voltage, Vout, of the photodetector 45 as a function of the contact pressure applied to the finger 40. FIG. 4b demonstrates the trends in the behavior of Vout as described above. In the "reddening" zone, Vout tends to increase with increasing contact pressure as shown by curve 46. In the "whitening" zone, Vout tends to decrease with increasing contact pressure as shown by curve 47. In both cases, however, Vout will reach an asymptotic value when the veins are collapsed and closed shut. The above described information can be used to determine if a contact pressure is applied to the finger 40. In an alternative embodiment, the magnitude of the output voltage of the photodetector, |Vout|, is measured to determine if contact pressure has been applied to a finger. If the magnitude value |Vout| is monitored, the trends of behavior shown by curve 46 and 47 in FIG. 4b remain the same because Vout, as shown in FIG. 4, is a positive value.

Figure 5:
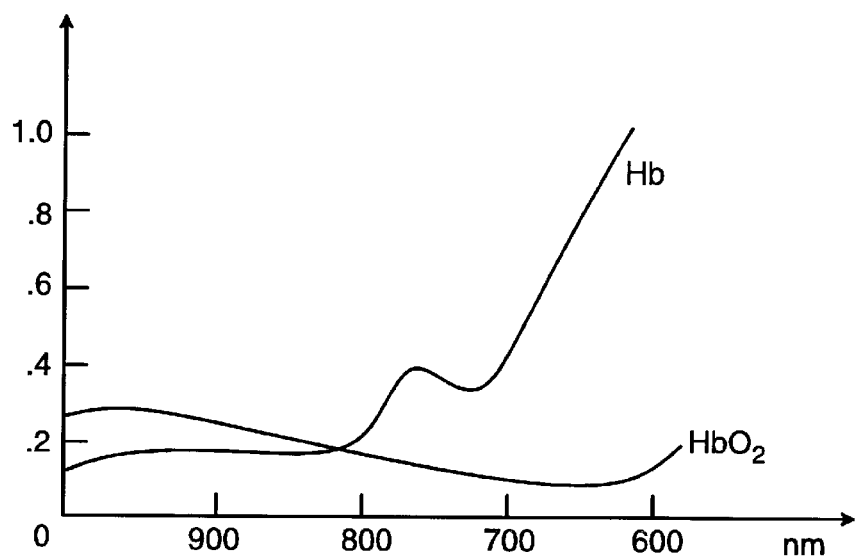
FIG. 5 schematically shows a graphical representation of the absorption curves for hemoglobin and oxy-hemoglobin.

In an alternative embodiment, an infrared LED at 940 n.m. is used as the light source 44. In this embodiment, the output voltage, Vout, increases with the contact pressure at a larger rate. This is because the trends of the absorption curves for hemoglobin and oxy-hemoglobin reverses after crossing the isobestic point at 800 n.m., as shown in FIG. 5. At 940 nm, an increase in oxygen saturation will result in a larger coefficient of absorption. If a high contact pressure is applied, the increase in effective path length caused by the increase in blood volume and the increase in coefficient of absorption caused by the increase in oxygen saturation will work together to increase the absorption of light and decrease the reflected infrared light at 940 nm. As a result, the output voltage, Vout, will increase.

In a further embodiment, the red LED at 660 nm and the infrared LED at 940 nm can be used in the same sensor to measure relative concentration of oxygen in the blood and enhance the sensor sensitivity. The two types of LED's are illuminated alternately and the reflected lights are measured by the same photo-detector with the aid of sample-and-hold circuitry. In yet another further embodiment, a third LED at the isobestic wavelength (770 nm) may be used to provide measurements of the absorption of light that are decoupled from the effect of oxygen concentration.

Figure 4C:
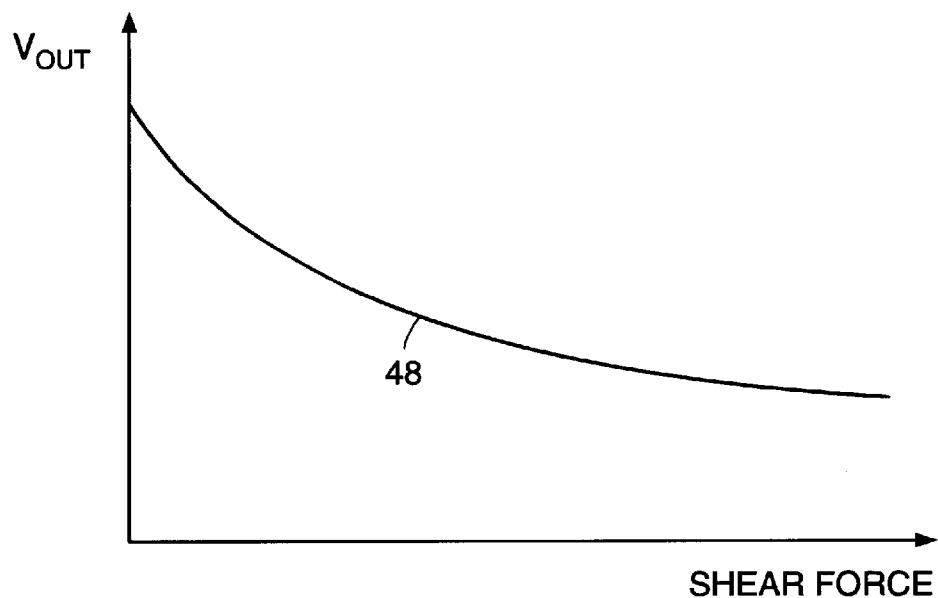
FIG. 4c schematically shows a graphical representation of the output voltage, Vout, of a photo-detector as a function of a shear force applied when using either the circuit as shown in FIG. 4a or the circuit shown in FIG. 6.

Next, the behavior of the fingernail sensor circuit in FIG. 4a with respect to a shear force applied to the finger will be described. FIG. 4c is a graphical representation of the trends in behavior of the output voltage, Vout, of the photodetector 45 as a shear force is applied to the finger. A shear force may be applied as a lateral force or as a longitudinal force. The following discussion will refer to a longitudinal shear force. As a longitudinal shear force is applied to the finger 40, a tension develops in the nail bed that results in a decrease in the volume of blood underneath the fingernail 41. As discussed above with respect to FIG. 2a–2d, this results in a broad whitening effect at the front of the nail. As the volume of blood decreases, less light is absorbed and more light is reflected by the area of the finger beneath the fingernail. As a result, Vout will decrease with increasing longitudinal shear force, as shown by curve 48 in FIG. 4c. In an alternative embodiment, if the magnitude |Vout| is monitored, the behavior of |Vout| will be the same as shown in FIG. 4c for Vout because Vout is a positive value. A similar behavior occurs as a result of a lateral shear force, although, as discussed above with respect to FIG. 2c and 2d, the whitening zone will occur at the sides of the fingernail 41.

Figure 4D:
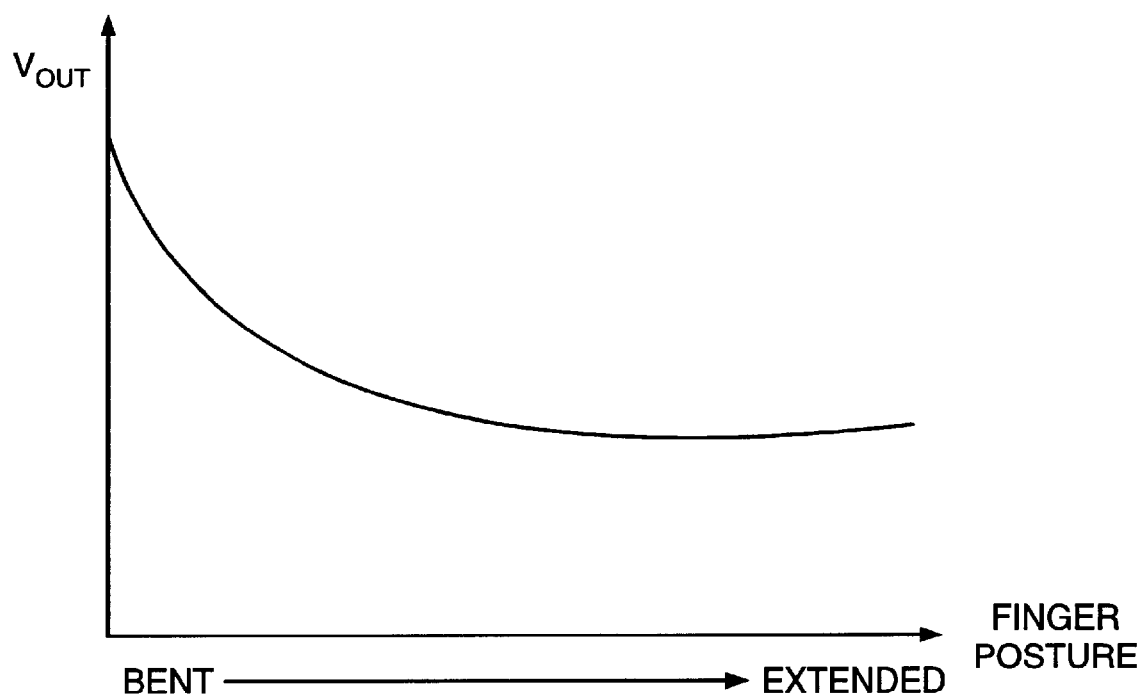
FIG. 4d schematically shows a graphical representation of the output voltage, Vout, of a photo-detector as a function of the posture of a finger when using either the circuit as shown in FIG. 4a or the circuit shown in FIG. 6.

The behavior of the circuit in FIG. 4a in response to the posture of the finger is shown in FIG. 4d. FIG. 4d is a graphical representation of the trends in behavior of the output voltage, Vout, of the photodetector 45 as the posture of the finger 40 is changed from a bent position to an extended position. As discussed above with respect to FIG. 3b, as the finger 40 is extended, a tension develops that collapses the capillaries and drives blood out of the nail bed. This causes a whitening zone to form towards the center of the fingernail 41. The decrease in the volume of blood results in a decrease in the light absorbed, an increase in light reflected and, therefore, Vout will tend to decrease as the finger is extended as shown in FIG. 4d. Alternatively, as the finger is bent, Vout tends to increase. In an alternative embodiment, if the magnitude Vout is monitored, the behavior of Vout will be the same as shown in FIG. 4d for Vout because Vout is a positive value.

Figure 6:
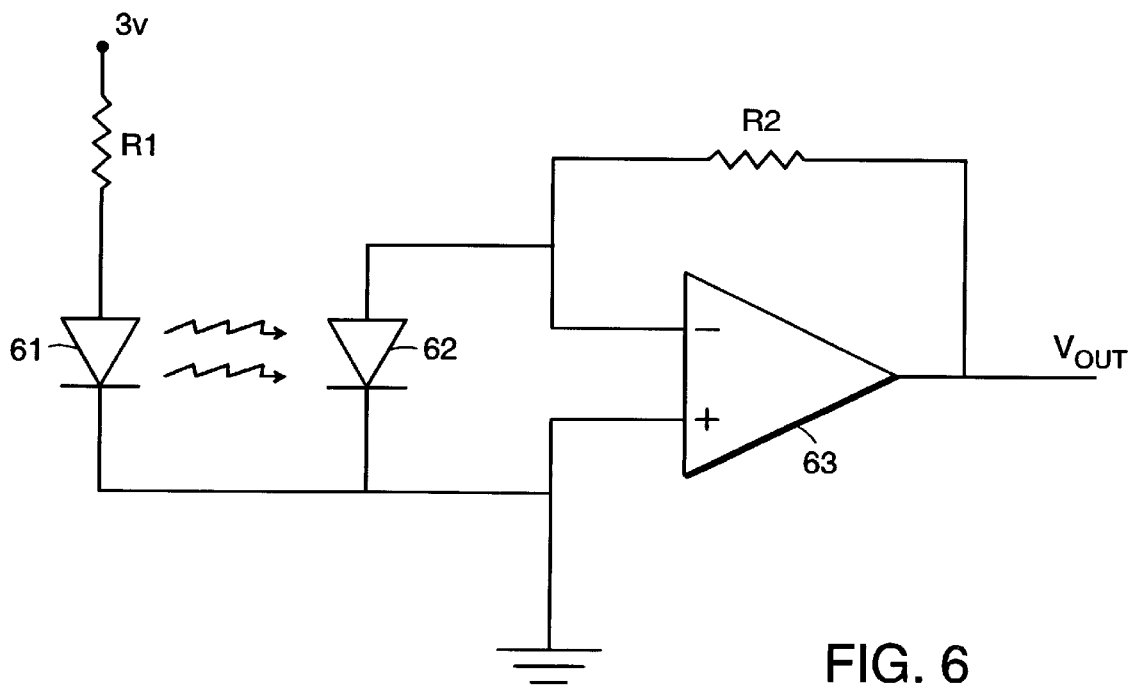
FIG. 6 schematically shows a fingernail sensor circuit that may be utilized in accordance with a preferred embodiment of the invention.

FIG. 6 schematically shows a fingernail sensor circuit in accordance with a preferred embodiment of the invention. A photodetector 62 is coupled to a light source 61. In this embodiment, the photodetector 62 is a photodiode and the light source 61 is a light emitting diode. Photodetector 62 is coupled to the inputs of an operational amplifier 63. The output, Vout, is measured at the output of operational amplifier 63. In the embodiment of FIG. 5, Vout is a negative value. The trends in the behavior of Vout in response to contact pressure applied to a finger, are the same as described above with respect to FIGS. 4a and 4b. However, in a preferred embodiment, the magnitude of the output voltage |Vout| is measured. If the magnitude |Vout| is monitored, the behavior of |Vout| will be reversed from that shown in FIG. 4b. In other words, the magnitude |Vout| will decrease with increasing contact pressure in a reddening zone and |Vout| will increase with increasing contact pressure in a whitening zone.

With respect to the circuit shown in FIG. 6, the behavior of Vout in response to shear forces will be the same as that described above with respect to FIG. 4c. However, in a preferred embodiment, the magnitude |Vout| is measured. The behavior of |Vout| will be reversed from that shown in FIG. 4c because Vout is a negative value as shown in FIG. 6. In other words, the magnitude |Vout| will increase with increasing shear force. Finally, the behavior of Vout, as shown in FIG. 6, with respect to the posture of the finger will be the same as described above with respect to FIG. 4d because Vout is a negative value. In contrast, if the magnitude |Vout| is measured, the behavior of |Vout| will be reversed from that shown in FIG. 4d. In other words, the magnitude |Vout| will increase as a finger is extended and decrease as a finger is bent.

Figure 7:
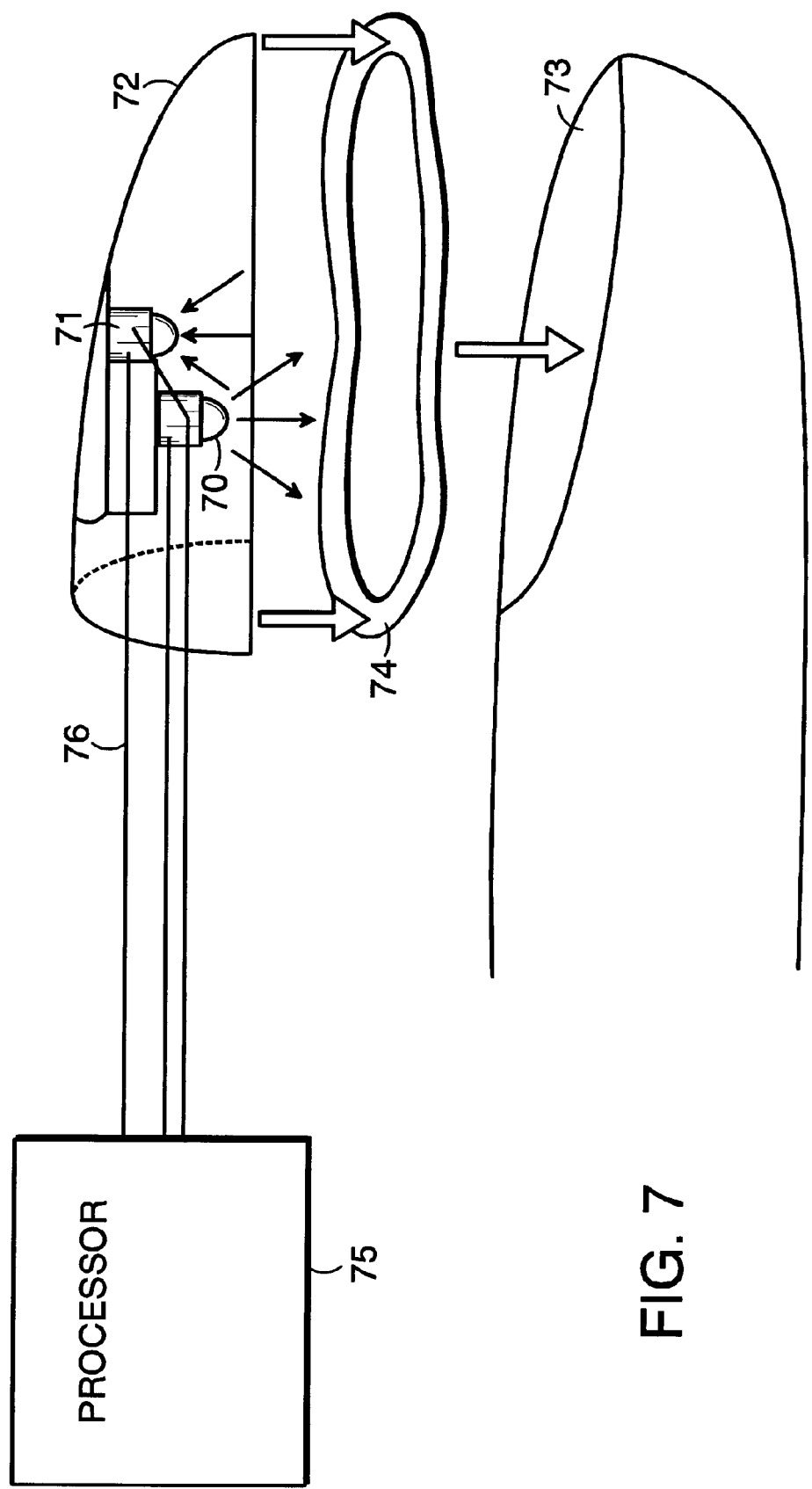
FIG. 7 schematically shows a device for detecting forces applied to a finger as well as the posture of a finger in accordance with an embodiment of the invention.

FIG. 7 schematically shows a device for detecting either the forces (e.g., normal and shear) applied to a finger or the posture of a finger or both in accordance with a preferred embodiment of the invention. A light source 70 and a photodetector 71 are embedded in a housing 72. In a preferred embodiment, the housing is a prefabricated plastic fingernail. The housing 72 may be coupled to a fingernail 73 using a coupling element 74. In a preferred embodiment, a coupling element 74 is a thin strip of adhesive around the perimeter of the housing 72. In an alternative embodiment, the coupling element 74, may be an transparent adhesive applied to the entire fingernail 73 through which light may be transmitted.

The light source 70 emits light into the fingernail 73. In one embodiment, the light source 70 may be natural light. In another embodiment, the light source 70 may be a light emitting diode (LED) such as a red LED at 660 nm or an infrared LED at 940 nm. In a preferred embodiment, the light source is an array of LEDs of differing wavelengths such as 660 nm, 770 nm, and 940 nm. By using different wavelengths of LED's both the change in the volume of blood and the relative concentration of oxygen in the blood may be measured. The photo-detector 71 is coupled to the light source 70 and measures the light reflected by the area of the finger beneath the fingernail 73. In one embodiment, the photo-detector 71 is a phototransistor. In a preferred embodiment, the photodetector 71 is a photodiode. The photodetector 71 may be an array of photodetectors which has a broad spectral range across the visible and the infrared in order to measure the pattern of color change visible through the fingernail 73.

The photo-detector 71 provides a signal with information corresponding to the change in reflected light in response to the forces applied to the finger or the posture of the finger. The signal is received by a processor 75. The processor 75 determines whether the change measured by the photodetector corresponds to a specified condition indicating that an external force has been applied to the finger or that the finger is bent or extended. In the fingernail sensor circuit configurations as described above with respect to FIGS. 4a and 6, for example, the output voltage of the circuit, Vout, increased as the contact pressure increased in a reddening zone. Returning to FIG. 7, in one embodiment, the processor 75 may receive the signal of the photodetector via wires 76. In an alternative embodiment, the processor 75 may receive the signal from the photodetector 71 via wireless transmission.

Figure 8C:
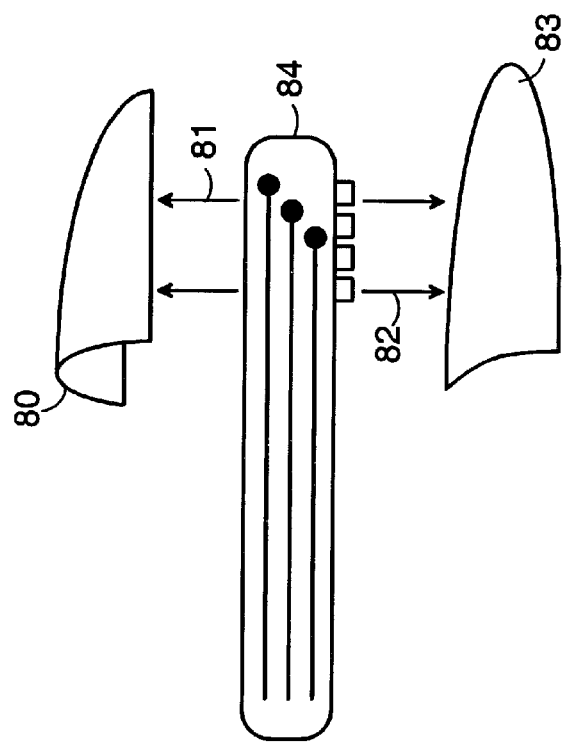
FIGS. 8a–8c schematically show a device for detecting forces applied to a finger as well as the posture of a finger in accordance with a preferred embodiment of the invention.
Figure 8A:
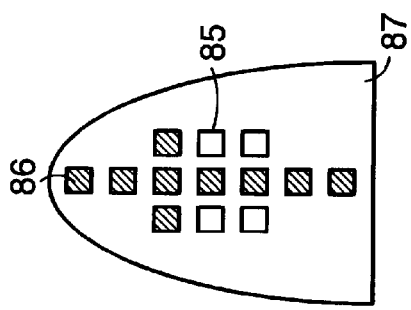
Figure 8B:
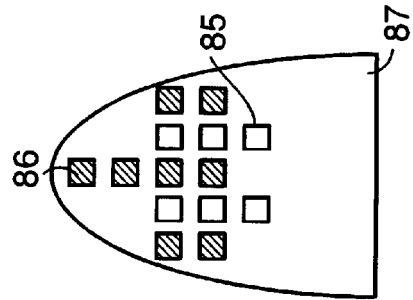

FIGS. 8a to 8c schematically shows a device for detecting forces (e.g., normal and shear) applied to a finger or the posture of a finger in accordance with a preferred embodiment of the invention. In FIG. 8a, a layout 87 of the optical components is shown. A array of LED's 85 and an array of photodetectors 86 are used in the layout 87. In one embodiment, the array of LED's 85 includes LED's of different wavelengths, for example, 660 nm, 770 nm, and 940 nm. The array of photodetectors 86 may be an array of phototransistors having a broad spectral range. In a preferred embodiment, the array of photodetectors is an array of photodiodes with a broad spectral range. In FIG. 8a, the array of photodetectors are placed along the longitudinal axis of a fingernail in order to measure the pattern of color change observable through the fingernail.

An alternative layout of optical components is shown in FIG. 8b. In FIG. 8b, a two-dimensional array of photodetectors 86 is used to measure the forces applied to a finger or the posture of a finger along two axes. Photodetectors 86, such as, for example, photodiodes are placed along the longitudinal axis of the fingernail as well as along the sides of the fingernail. An array of LED's 85 are distributed between the photodetectors 86 in order to illuminate the entire nail bed. In a preferred embodiment, the LED's illuminate the nail bed with infrared light at the isobestic wavelength (770 nm).

The array of LED's and the array of photodetectors are mounted on a flexible strip 84 which can be bent to the shape of a fingernail as shown in FIG. 8c. The flexible strip is coupled to a housing 80 with an epoxy 81. In a preferred embodiment, the housing 80 is a prefabricated plastic fingernail. The flexible strip 84 is coupled to an optical epoxy 82 which is transparent to light and is used to couple the flexible strip 84 to a fingernail. The flexible strip 84 is molded to the shape of a fingernail using a fingernail mold 83. The flexible strip 84 is coupled to the fingernail mold 83 with the optical epoxy 82. The fingernail mold 83 is removed before placing the flexible strip 84 on a fingernail. The optical epoxy 82 will couple the flexible strip 84 to the fingernail. In an alternative embodiment, the circuit board is not flexible. An optically transparent epoxy is molded into the shape of a fingernail and the optical components are coupled to the epoxy. A transparent adhesive is then used to attach the sensor to the fingernail.

The fingernail sensor preferably is suited for miniaturization. Most of the primary components, including LED and photo detectors, may be less than 1 m.m. square in size and can be mounted on fingernails. The burden on the wearer thus is minimized, and the sensors can be worn comfortably for a long period of time. These features should facilitate development of novel human machine interface and interactive control methods that would otherwise be impractical and infeasible.

The described embodiments of the invention are intended to be merely exemplary and numerous variations and modifications will be apparent to those skilled in the art. All such variations and modifications are intended to be within the scope of the present invention.

We claim:

1. A device for detecting the posture of a finger, the finger having a fingernail illuminated by light, the device comprising:

at least one photodetector for measuring a change in light reflected by an area of the finger beneath the fingernail in response to the posture of the finger and providing a signal corresponding to the change; and a processor for receiving the signal and determining whether the change corresponds to a specified condition.

2. A device according to claim 1, wherein the photodetector is an array of photodetectors, the array of photodetectors having a spectral range.

3. A device according to claim 2, wherein the spectral range includes visible and infrared wavelengths.

4. A device according to claim 1, further including at least one light source, coupled to the photodetector, the light source for emitting light into the fingernail.

5. A device according to claim 1, further including a set of light sources coupled to the photodetector, the set of light sources having varying wavelengths and for emitting light into the fingernail.

6. A device according to claim 1, further including:

a housing, enclosing the photodetector; and a coupling element, connected to the housing, the coupling element for coupling the housing to the fingernail.

7. A device according to claim 6, wherein the coupling element is a transparent adhesive material.

8. A device according to claim 1, wherein the posture of the finger is a bent position.

9. A device according to claim 1, wherein the posture of the finger is an extended position.

10. A method for detecting the posture of a finger, the finger having a fingernail illuminated by light, the method comprising:

providing at least one photodetector;

measuring a change in light reflected by an area of the finger beneath the fingernail in response to the posture of the finger;

providing a signal corresponding to the change; and comparing the change and a specified condition.

11. A method according to claim 10, wherein the photodetector is an array of photodetectors, the array of photodetectors having a spectral range.

12. A method according to claim 11, wherein the spectral range includes visible and infrared wavelengths.

13. A method according to claim 10, further including illuminating the fingernail with light from a light source.

14. A method according to claim 10, further including illuminating the fingernail with light from a set of light sources, the set of light sources having varying wavelengths.

15. A method according to claim 13, further including:

enclosing the photodetector and the light source in a housing; and coupling the housing to the fingernail.

16. A method according to claim 10, wherein the posture of the finger is a bent position.

17. A method according to claim 10, wherein the posture of the finger is an extended position.

18. An apparatus for detecting a shear force applied to a finger, the finger having a fingernail illuminated by light, the apparatus comprising:

at least one photodetector for meassuring a change in light reflected by an area of the finger beneath the fingernail in response to the shear force applied to the finger and providing a signal corresponding to the change; and a processor for receiving the signal and determining whether the change corresponds to a specified condition.

19. An apparatus according to claim 18, wherein the photodetector is an array of photodetectors, the array of photodetectors having a spectral range.

20. An apparatus according to claim 19, wherein the spectral range includes visible and infrared wavelengths.

21. An apparatus according to claim 18, further including at least one light source, coupled to the photodetector, the light source for emitting light into the fingernail.

22. An apparatus according to claim 18, further including a set of light sources coupled to the photodetector, the set of light sources having varying wavelengths and for emitting light into the fingernail.

23. An apparatus according to claim 18, further including:

a housing, enclosing the photodetector; and a coupling element, connected to the housing, the coupling element for coupling the housing to the fingernail.

24. An apparatus according to claim 23, wherein the coupling element is a transparent adhesive material.

* * * * *

UNITED STATES PATENT AND TRADEMARK OFFICE
CERTIFICATE OF CORRECTION

PATENT NO. : 6,388,247 B2
DATED : May 14, 2002
INVENTOR(S) : Haruhiko H. Asada et al.

It is certified that error appears in the above-identified patent and that said Letters Patent is hereby corrected as shown below:

<u>Column 11,</u>
Line 9, replace "meassuring" with -- measuring --.

Signed and Sealed this

Seventh Day of October, 2003

JAMES E. ROGAN
*Director of the United States Patent and Trademark Office*